Patented June 20, 1939

2,162,936

UNITED STATES PATENT OFFICE 2,162,936

PROCESS OF RECOVERING GOLD FROM SOLUTIONS

Harry Burrell, Bloomfield, N. J., assignor to Ellis-Foster Company, a corporation of New Jersey No Drawing. Application March 23, 1937, Serial No. 132,542

18 Claims. (Cl. 75—108)

This invention relates to the manufacture and use of water-insoluble materials for the purpose of efficiently and economically recovering gold from solutions. These materials have the advantage that they will completely remove the gold from very dilute solutions. It relates specifically to those water-insoluble resins and resinoids obtained from polyhydric phenols, and their natural and synthetic derivatives. The products of the present invention are especially adapted to recover gold from waste waters from processes utilizing gold.

The insolubilization of polyhydric phenols or their derivatives may be secured by reaction with aldehydes, by treatment with concentrated acids, or by oxidation. In either case, condensation, polymerization, and other reactions occur which are allowed to proceed until the reactants have produced a water-insoluble product. Conditions such as time, temperature, and concentration may be adjusted so that the material produced is naturally obtained in a finely divided state; or the resins may be mechanically pulverized if precipitated in such a condition that the granule size is too large. In any event, it is advisable to have the final product as a fine powder. When this material is held for a time in contact with a solution of a metal, even though the solution be very dilute, the metal is taken up completely by sorption, the resinous particles may be removed, and the metal recovered therefrom. Certain metals other than gold have been removed from solution, and are not excluded, but an excess of insolubilized phenols is usually required. The materials differ among themselves as to their sorption capacities.

Both natural and synthetic polyhydric phenols and their derivatives may be used. I prefer to use naturally occurring derivatives as starting material, because of the availability and cheapness. The tannins are especially applicable, and although extracted materials, such as quebracho and chestnut extracts, are very valuable, the original woods containing these tannins, may also be used. That is to say, I do not limit suitable raw materials to purified phenols or phenolic derivatives, but there may be present adulterants, such as cellulose for example, even to such an extent that the impurity preponderates. Another suitable naturally occurring phenol is that from the poison ivy plant or from urushiol; sulphite liquors or the solids thereof may also be used, these being very cheap and available in large amounts.

Of the aldehydes, formaldehyde is preferably used, but furfural, acetaldehyde, butyraldehyde, and other equivalents are not excluded.

As acid insolubilizing agents, concentrated sulphuric acid, sulphonic acids, acid sludge from petroleum refining, phosphoric acid, phosphoric anhydride, hydrofluosilicic acid, and their chemical equivalents are suitable.

The choice of insolubilizer is largely a matter of economy. Because sulphuric acid and its equivalents are at present available in large supply at relatively cheap unit cost, this class is preferable for commercial application. In this connection, acid sludge, for example, from petroleum white-oil refining, for which there is little market, is especially valuable. The resins produced by condensation with formaldehyde or by oxidation have a high order of efficiency, however, and should not be totally excluded merely for economic reasons.

The finished product should be in a fine state of subdivision because this increases the efficiency of metal recovery and also reduces the time required for complete extraction. Although the resins may be mechanically pulverized to any desired state, this extra step in manufacturing may be eliminated by proper choice of materials, temperatures, and concentrations. Thus, tannic and gallic acids when reacted with formaldehyde under reflux yield light powdery precipitates; and if quebracho extract is reacted with formalin at room temperature the gel produced dries out to a fine powder.

In making the products of this invention, I may take quebracho extract, for example, and react it with formaldehyde solution at refluxing temperature or at room temperature, using an acid such as hydrochloric as a catalyst. Other substances suitable for reacting with formaldehyde include chestnut extract, fustic, cutch, tumeric, gambier, sumac, logwood, tannic acid, gallic acid, sulphite liquor, resorcinol, phloroglucinol, or poison ivy extract. The phenolic reactant may be dissolved or suspended in the aldehyde, adjusted to desirable temperature and concentration, by dilution with water if necessary, and a catalyst which may be acid or alkaline is added, whereupon a reaction takes place, and after sufficient lapse of time an insoluble product is obtained.

On the other hand, the phenolic reactants such as those listed in the preceding paragraph may be added with stirring to concentrated sulphuric acid, acid sludge, or other acid insolubilizer. A spontaneous temperature rise usually takes place, and the reaction mixture assumes a dark color. It is desirable to keep the temperature between 60° C. and 120° C. and heating or cooling may be necessary to secure these conditions. The reaction is allowed to take place until the product is substantially completely insoluble in water.

The reaction mixture obtained by either the acid treatment or aldehyde treatment is diluted and cooled with a large volume of water which serves to wash away those by-products which may be water-soluble. The precipitate may be filtered off or allowed to settle out, dried, and pulverized if necessary. The product is then ready for use.

It need only be added directly to a water containing gold and agitated sufficiently to keep the resin suspended for several minutes. The longer the time available for contact between the material and the solution, the smaller the amount required to absorb or adsorb a given quantity of recoverable metal. A very small quantity is all that is necessary to produce the desired result. The material is then filtered off or allowed to settle out, and the treated water may safely be run to waste.

The metal may be recovered by extracting with a suitable solvent; for example with cyanide solution. In this case the resin may be used again, preferably after digestion in dilute acid or a brine solution. Another method of recovering the metal concentrate is to ignite the resin; although the resin is destroyed by this process, it may be produced so cheaply that it may be ultimately profitable to effect recovery in this manner.

In the case of gold extraction, it has been determined that calcium ions or sodium chloride do not have any interfering action, but cyanide ion in alkaline solution reduces the efficiency of the process. This reduction in efficiency is sometimes as high as about 50 per cent. The effect of cyanide may be overcome by adding a small amount of acid, for example sulphuric acid, to the solution so that the pH is reduced at least to about 4. Then when the powdered insolubilized phenolic is added, the gold is substantially completely extracted.

The following examples are given for illustrative purposes and should not be construed as to limit the invention as to scope or proportions. The proportions are by weight.

*Example 1.*—A solution of 100 parts of quebracho extract dissolved in 500 parts water was diluted with 500 parts water and 200 parts 37% formalin, and the solution was heated to boiling. Fifty parts of hydrochloric acid diluted with 150 parts water were added and the entire mass set to a soft gel. This was broken up, washed with water, and dried. The lumps were pulverized and screened through 60 mesh.

One liter of a solution of gold chloride containing 0.5 g. per liter was agitated (stirred) with 2 g. of the powdered resin for 30 minutes. The resin was filtered off and the filtrate tested for gold with benzidine acetate. The test was negative showing that the gold was substantially completely removed from solution.

*Example 2.*—Example 1 was repeated, allowing the reaction to take place at room temperature without applying heat. The dried product was a light powder. When suspended in 0.05% gold chloride solution in proportion of 2 g. per liter for 15 minutes, the gold was substantially completely absorbed.

*Example 3.*—One hundred parts of quebracho extract were mixed with 500 parts of an acid sludge which consisted of the water-soluble sulphonic acids from a white oil treating plant, and the mixture was heated to 80° C., held there for 10 minutes, and allowed to cool to 60° C. The product was poured into a large volume of water, and the precipitate was washed and dried.

The finely powdered material was agitated with 0.05% gold chloride solution at the rate of 2 g. per liter for 15 minutes in one case, and in another case with 1 g. per liter for 30 minutes. In neither of these cases could gold be found present in the filtrate.

*Example 4.*—The procedure of Example 3 was repeated, using 2 g. resin per liter and agitating for 15 minutes, and 2 g. sodium cyanide were added per liter of gold chloride solution, a large proportion of the gold remained in the filtrate after the resin was removed.

The test was repeated, adding sufficient sulphuric acid to adjust the pH to 4.0. In this case the gold was substantially completely removed from solution.

*Example 5.*—A portion of the resin produced in Example 1 which had been used to extract gold from gold chloride solution was placed in sodium cyanide solution and allowed to stand exposed to air for 3 days. The exhausted resin was filtered off, washed, and the washing added to the filtrate. The gold was found to have dissolved in the cyanide solution from the resin. The resin was digested in 5% hydrochloric acid, washed, and used again for gold absorption, and was found to be effective for that purpose.

Another portion was strongly ignited and the ash was found to contain gold.

*Example 6.*—One hundred parts of powdered standard chestnut extract were stirred into 300 parts of concentrated sulphuric acid. The mixture turned black, frothed, and the temperature rose to about 90° C. After standing 30 minutes, it was poured into a large volume of water, filtered, and dried.

The powdered product was used at the rate of 2 g. per liter of 0.05% gold chloride solution, stirring for 15 minutes. The gold was substantially completely extracted.

*Example 7.*—Fifty parts of chestnut wood sawdust were stirred into 300 parts of concentrated sulphuric acid and allowed to stand ½ hour. The mixture was poured into a large volume of water, filtered, and dried.

The powdered product removed the gold from a 0.05% solution of gold chloride in 15 minutes when used at the rate of 2 g. per liter of solution.

*Example 8.*—One hundred parts quebracho extract and 150 parts phosphoric anhydride were stirred together dry. A violent reaction took place with much spontaneous heating. The product was a black granular mass which was washed with a large volume of water and dried.

Gold was recovered when used under the same conditions as the preceding examples.

*Example 9.*—Fifty parts of quebracho extract were dissolved in 500 parts water and 100 parts acetaldehyde and 50 parts concentrated hydrochloric acid were added. The solution was boiled for 30 minutes under reflux when a resin had separated. This was filtered off, washed, and dried. The powdered product removed gold from solution as in the preceding examples.

*Example 10.*—Fifty parts gallic acid, 500 parts water, 100 parts 37% formalin, and 25 parts concentrated hydrochloric acid were boiled under reflux for 30 minutes. The light-colored resin was filtered off, washed, and dried. The product was a light-colored, fluffy powder which did not require further grinding. It removed gold as in the preceding examples.

*Example 11.*—Fifty parts tannic acid, 500 parts water, 100 parts 37% formalin and 25 parts concentrated ammonium hydroxide were boiled under reflux for 30 minutes. The precipitate was filtered off, washed and dried. The product was similar to that of Example 10. It could be used to recover gold as in the preceding examples.

*Example 12.*—One hundred parts Sicily sumac, 200 parts 37% formalin, and 500 parts water were brought to a boil. Fifty parts of concentrated hydrochloric acid were added, and the whole boiled for 15 minutes. The precipitate was filtered off and dried to produce a fine powder. This removed gold from gold chloride solution as in the preceding examples.

*Example 13.*—One hundred parts of solids from an evaporated poplar sulphite waste liquor were stirred into 300 parts of concentrated sulphuric acid. After standing 30 minutes, the reaction mixture was poured into a large volume of water, filtered, and dried.

The pulverized product removed gold successfully from solution when used under the foregoing conditions.

*Example 14.*—A solution of 250 parts of quebracho extract in 1000 parts of water was made strongly alkaline by addition of 200 parts sodium hydroxide. The solution was heated on a steam bath for 4 hours while air was blown through it. Water was added to replace that lost by evaporation. The solution darkened and became viscous. The cooled solution was acidified with sulphuric acid and the resulting precipitate filtered off, washed and dried.

This product was slightly soluble in water but gold was successfully extracted when used in the proportions of the preceding examples.

What I claim is:

1. The process of removing gold from solutions comprising suspending a powdered acid-produced polyhydric phenol resin which is insoluble in water, in a gold-containing solution, allowing the resin to remain in contact with the solution until the gold is sorbed, and removing the suspended powder containing sorbed gold.

2. The process of removing gold from solutions comprising suspending a powdered aldehyde-insolubilized polyhydric phenol resin which is insoluble in water, in a gold-containing solution, allowing the resin to remain in contact with the solution until the gold is sorbed, and removing the suspended powder containing sorbed gold.

3. The process of removing gold from solutions comprising suspending a powdered oxidation-produced polyhydric phenol resin which is insoluble in water, in a gold-containing solution, allowing the resin to remain in contact with the solution until the gold is sorbed, and removing the suspended powder containing sorbed gold.

4. The process of removing gold from solutions comprising suspending a powdered water-insolubilized polyhydric phenol resin in a gold-containing solution, allowing the resin to remain in contact with the solution until the gold is sorbed, and removing the suspended powder containing sorbed gold.

5. The process of removing gold from solutions comprising suspending a powdered acid-treated tannin resin which is water insoluble, in a gold-containing solution, allowing the resin to remain in contact with the solution until the gold is sorbed, and removing the suspended powder containing sorbed gold.

6. The process of removing gold from solutions comprising suspending a powdered aldehyde tannin resin which is insoluble in water, in a gold-containing solution, allowing the resin to remain in contact with the solution until the gold is sorbed, and removing the suspended powder containing sorbed gold.

7. The process of removing gold from solutions comprising suspending a powdered oxidized tannin resin which is water insoluble, in a gold-containing solution, allowing the resin to remain in contact with the solution until the gold is sorbed, and removing the suspended powder containing sorbed gold.

8. The process of removing gold from solutions comprising suspending a powdered tannin resin which is insoluble in water, in a gold-containing solution, allowing the resin to remain in contact with the solution until the gold is sorbed, and removing the suspended powder containing sorbed gold.

9. The process of removing gold from solutions comprising suspending a powdered acid-treated polyhydric phenol resin which is insoluble in water, in a gold-containing solution, allowing the resin to remain in contact with the solution until the gold is sorbed, and removing the suspended powder containing sorbed gold.

10. The process of removing gold from solutions comprising suspending a powdered water-insoluble aldehyde polyhydric phenol resin in a gold-containing solution, allowing the resin, to remain in contact with the solution until the gold is sorbed, and removing the suspended powder containing sorbed gold.

11. The process of removing gold from solutions comprising suspending a powdered water-insoluble polyhydric phenol resin produced by oxidation, in a gold-containing solution, allowing the resin to remain in contact with the solution until the gold is sorbed, and removing the suspended powder containing sorbed gold.

12. The process of removing gold from solutions comprising suspending a powdered water-insoluble polyhydric phenol resin, in a gold-containing solution, allowing the resin to remain in contact with the solution until the gold is sorbed, and removing the suspended powder containing sorbed gold.

13. The process of recovering gold from solutions comprising suspending a powdered water-insoluble polyhydric phenol resin, in a gold-containing solution, allowing the resin to remain in contact with the solution until the gold is sorbed, removing the suspended powder containing sorbed gold, and extracting the gold from the powder with alkali metal cyanide solution.

14. The process of recovering gold from solutions comprising suspending a powdered water-insoluble polyhydric phenol resin, in a gold-containing solution, allowing the resin to remain in contact with the solution until the gold is sorbed, removing the suspended powder containing sorbed gold and igniting the powder.

15. The process of removing gold from solutions thereof comprising suspending in a dilute gold solution, a powdered water-insolubilized resin derived from a substance of the class consisting of quebracho extract, chestnut extract, poison-ivy extract, sulphite waste liquors, fustic, cutch, turmeric, gambier, sumac, logwood, tannic acid, gallic acid, resorcinol and phloroglucinol, allowing the resin to remain in contact with the solution until the gold is sorbed and removing the suspended powder containing sorbed gold.

16. The process of removing gold from dilute solutions thereof comprising suspending in a dilute gold solution, a powdered resin produced by reacting sulphuric acid with a substance of the class consisting of quebracho extract, chestnut extract, poison-ivy extract, sulphite waste liquors, fustic, cutch, turmeric, gambier, sumac, logwood, tannic acid, gallic acid, resorcinol and phloroglucinol, allowing the resin to remain in contact with the solution until the gold is sorbed and removing the suspended powder containing sorbed gold.

17. The process of removing gold from dilute solutions thereof comprising suspending in a dilute gold solution, a powdered resin produced by reacting formaldehyde with a substance of the class consisting of quebracho extract, chestnut extract, poison-ivy extract, sulphite waste liquors, fustic, cutch, turmeric, gambier, sumac, logwood, tannic acid, gallic acid, resorcinol and phloroglucinol, allowing the resin to remain in contact with the solution until the gold is sorbed and removing the suspended powder containing sorbed gold.

18. The process of removing gold from solutions thereof comprising suspending in a dilute gold solution a powdered water-insolubilized resin produced by oxidizing a substance of the class consisting of quebracho extract, chestnut extract, poison-ivy extract, sulphite waste liquors, fustic, cutch, turmeric, gambier, sumac, logwood, tannic acid, gallic acid, resorcinol and phloroglucinol, allowing the resin to remain in contact with the solution until the gold is sorbed and removing the suspended powder containing sorbed gold.

HARRY BURRELL.